United States Patent Office 3,355,443
Patented Nov. 28, 1967

3,355,443
METHOD OF POLYMERIZING ETHYLENE
Kazuo Itoi, Kurashiki, Japan, assignor to Kurashiki
Rayon Company Limited, Kurashiki, Japan, a corporation of Japan
No Drawing. Filed Feb. 11, 1964, Ser. No. 343,967
Claims priority, application Japan, Feb. 14, 1963,
38/6,015
4 Claims. (Cl. 260—94.9)

This invention relates to an improvement in the method of polymerization of ethylene characterized in that use is made of a catalyst consisting of a combination of tin hydride compounds having at least one ≡Sn—H bond in its molecule and a compound of metals of A groups of the IVth to VIth in the Periodic Table. Polyethylene to be obtained by the method of polymerization of unsaturated hydrocarbon of olefin series by using the present catalysts has very high molecular weight and is difficult to be worked in usual conditions. The present invention relates to a method of obtaining polyethylene having molecular weight of about 10,000 to 150,000 by using such catalyst yet without using chain transfer agent. As a result of various investigations about the catalyst of tin hydrides for the above purposes the inventor has found the following fact and accomplished the present invention.

When ethylene is polymerized with a catalyst consisting of a combination of tin monohydrides having a general formula $R_3Sn H$ (where R is alkyl-, aryl- or cycloalkyl radical) and halides or oxyhalides of metals of A groups of the IVth to VIth in the Periodic Table it was found that the polymerization is different between the case of the mole ratio of tin hydride and transition metal compounds is more than 2:1 and less than 2:1. The first of the large difference is that when the above mole ratio is higher than 2:1, sufficient polymerization property may be obtained by mixing the above two compounds under the existence of inert gas such as nitrogen, but when the mole ratio is less than 2:1, if the catalyst is regulated to such condition, the polymerization becomes very inactive and substantially loses polymerization ability. On the contrary, when the above two are mixed under the ethylene current the polymerization is started at once and very active catalyst can be produced, that is, at less than 2:1 of mole ratio the substantial co-existence of ethylene is necessary condition of producing active catalyst.

The second difference is that as shown in Table 1 when the catalyst is regulated under the flow of ethylene at more than 2:1 of mole ratio the molecular weight of the produced polyethylene is considerably high and there is no large change in the molecular weight even when the mole ratio is changed, but at less than 2:1 of mole ratio the molecular weight becomes low quickly so that it is possible to produce polyethylene having practicable molecular weight.

TABLE 1.—RELATION BETWEEN Sn/Ti MOLE RATIO AND MOLECULAR WEIGHT (×10⁻⁴)

| External temp., ° C. | Sn/Ti Mole ratio | | | | |
|---|---|---|---|---|---|
| | 1 | 2 | 4 | 6 | 10 |
| 40 | 48 | 39 | 42 | 49 | 53 |
| 20 | 11 | 46 | 52 | 59 | |

Condition of polymerization: n-heptane 150 cc., titanium tetrachloride was 0.3 cc. kept at constant, while charging quantity of tributyl tin hydride was changed to change mole ratio.

The third difference is that the catalysts having more than 2:1 of mole ratio have substantially no polymerization activity for ethylene at a temperature of 0° C., whilst the catalyst having mole ratio of below 2:1 has sufficient activity even at −20° C. so that any practicable polyethylene having a suitable molecular weight can be obtained by changing polymerization temperature.

Based on the above described facts this invention is characterized in that a catalyst is manufactured by mixing an organo tin monohydride and a transition metal compound at a mole ratio of less than 2 under the existence of ethylene, thereby polymerizing ethylene and its advantages are as follows:

(1) No chain transfer agent is necessary for the manufacture of polyethylene having any suitable molecular weight.

(2) The temperature range of the active catalyst is very broad.

(3) It is economical since the quantity of comparatively expensive tin hydride is small.

(4) By mixing two components under the existence of ethylene no special regulation of catalyst is necessary so that the catalyst can be manufactured in a polymerization vessel directly.

(5) The polymerization occurs at once without induction period so that the continuous polymerization is possible at a high polymerization speed.

In case of polymerization according to this invention it is preferable to effect the polymerization under the existence of saturated hydrocarbon, halogenated hydrocarbon, aromatic hydrocarbon and the like inert solvents.

In the case of manufacturing catalyst compositions of this invention organo tin monohydride and transition metal compound may be mixed at a rate of mole ratio less than 2 under the current of ethylene or ethylene dissolved in inert solvent, there is no substantial effect on the order of adding them, but there are many cases where in each component itself is in the state of solid and the reacted catalysts compositions are solid state so that the mixing is considerably difficult due to local heating so that it is preferable to mix the two components by stirring under the existence of large amount of solvent. The polymerization proceeds sufficiently under or above the atmospheric pressure of ethylene.

The invention will be explained by means of examples which are not limitative.

*Example 1*

150 cc. of n-heptane was added in a 300 cc. four necked flask, fitted with a stirrer, thermometer, ethylene inlet tube and reflux condenser, after the air in the apparatus was replaced by passing the ethylene for 15 minutes under the stirring, and then continued ethylene passing for 15 minutes. Then it was cooled to a temperature of 0° C. and 0.3 cc. of titanium tetrachloride and 0.8 cc. of tributyl tin hydride were added, then brown colored precipitation occurred and the polymerization started at once and the temperature in the flask increased to 15° C. after 10 minutes. Maintaining the external temperature at 0° C. and after 1 hour of the polymerization the introducing of ethylene is stopped and methanol is added, then the content became white color at once. After filtering and washing with methanol, 150 cc. methanol containing 20% (by volume) of hydrochloric acid was added and boiled for 7 hours and then filtered and after washed 3 times with methanol dried at 80 to 100° C. for 24 hours. Polyethylene thus obtained was white powder of 10 g. and its molecular weight calculated according to the formula of H. Tung (J. Poly. Sci. 24 333) from the viscosity of tetralin solution was 81,000 and the melting point obtained by the differential thermal analysis was 131° C.

*Example 2*

When 1.5 cc. (mole ratio of Sn/Ti 2.04) of tributyl tin hydride were used in the same condition with Example 1, 1.2 g. of polyethylene having molecular weight of 480,000 only were obtained.

*Examples 3-6*

According to the similar condition with Example 1 the external temperature was maintained at 40° C., and 1.0 cc. of tributyl tin hydride was regulated at constant, while the quantity of titanium tetrachloride was changed to change the mole ratio of Sn/Ti and the results are shown in Table 2 showing that the molecular weight of polyethylene obtained became suddenly reduced at the Sn/Ti mole ratio lower than 2. The similar results are shown in Table 1 in the case of constant titanium tetrachloride as shown in Table 1.

TABLE 2

| Examples | Charged titanium tetrachloride | Sn/Ti (mole ratio) | Polyethylene produced | |
|---|---|---|---|---|
| | | | Yield (g.) | Molecular weight (10,000) |
| | 0.05 | 8.14 | 4.6 | 49 |
| 4 | 0.10 | 4.07 | 7.8 | 56 |
| 5 | 0.20 | 2.04 | 3.1 | 43 |
| 6 | 0.40 | 1.02 | 8.5 | 3.8 |

*Examples 7-14*

To the same apparatus as in Example 1 were charged 150 cc. of n-heptane and air was replaced with nitrogen by passing it at 10° C. for 15 minutes and a required quantity of tributyl tin hydride and titanium tetrachloride were added and while passing nitrogen current for a required time the catalyst was controlled, then ethylene was passed to keep the internal temperature to 10° C. and polymerized for 30 minutes and purified in the similar manner to Example 1, the results of which are shown in Table 3 which shows that when controlled under the nitrogen current the activity was reduced considerably so that it shows that ethylene is necessary for the production of catalyst.

*Example 16*

According to the similar manner to Example 1, 0.75 cc. of tributyl tin hydride and 0.3 cc. of titanium tetrachloride were added at −5° C. to polymerize at the same temperature for 30 minutes and yielded 6.8 g. of polyethylene having molecular weight of 144,000.

*Example 17*

According to the similar manner to Example 1, 0.5 cc. of tributyl tin hydride and 0.2 cc. of titanium tetrachloride were added at 10° C. and after 3 minutes the internal temperature was cooled to −20° C. to −15° C. to polymerize at the same temperature for 27 minutes and yielded 7.5 g. of polyethylene having molecular weight of 144,000.

*Example 18*

500 cc. of n-hexane was charged in a 1 liter autoclave with stirring and autoclave was kept by 5 atmospheric pressures of ethylene at room temperature and then ethylene was discharged and by repeating the same operation 4 times to replace air in the autoclave with ethylene, 0.5 cc. of tributyl tin hydride and 0.2 cc. of titanium tetrachloride were charged while stirring and the outside of the autoclave was cooled by water and 20 atmospheric pressures of ethylene were introduced, then the polymerization started at once and the pressure was reduced and internal temperature was raised. After the polymerization was effected for 30 minutes by maintaining a constant 20 atmospheric pressure ethylene was discharged and the cover was opened to take out the content which was crushed in a mixer together with methanol and at the same time the catalyst was decomposed and after filtered and treating in the similar manner to Example 1 and obtained 117 g. of polyethylene having molecular weight of 51,000.

*Example 19*

A glass ampule containing 0.2 cc. of titanium tetrachloride was introduced into a vibrating type autoclave having 250 cc. of internal volume and after the cover was closed the air was replaced with ethylene, then 100 cc. of liquid propane dissolved 0.5 cc. of tributyl tin hydride were charged therein, and ethylene was introduced to make the total pressure to 50 atmospheric pressures at room temperature, then vibrating the autoclave to crush the ampule and the polymerization started at once. After 2.5 hours the pressure was discharged and the cover was opened and obtained by treating in the

TABLE 3

| Examples | Charged titanium tetrachloride (cc.) | Charged butyl tin hydride (cc.) | Sn/Ti (mole ratio) | Controlling time (min.) | Polyethylene produced | |
|---|---|---|---|---|---|---|
| | | | | | Yield (g.) | Molecular weight (10,000) |
| 7 | 0.3 | 0.5 | 0.67 | 0 | 11.9 | 11.8 |
| 8 | 0.3 | 0.5 | | 1 | 3.0 | 6.1 |
| 9 | 0.3 | 0.5 | | 3 | 3.2 | 9.0 |
| 10 | 0.3 | 0.5 | | 5 | 3.9 | 8.6 |
| 11 | 0.3 | 0.5 | | 7 | 0 | |
| 12 | 0.3 | 0.5 | | 9 | 0 | |
| 13 | 0.2 | 0.5 | 1.0 | 3 | 9.5 | |
| 14 | 0.2 | 0.5 | 1.0 | 10 | 0 | |

*Example 15*

According to the similar manner to Example 1, 0.25 cc. of triethyl tin hydride and 0.1 cc. of titanium tetrachloride were added at 40° C. and polymerized at the same temperature for 30 minutes and yielded 8.4 g. of polyethylene having molecular weight of 62,000.

similar manner to Example 18, 36 g. of polyethylene having molecular weight of 55,000.

What I claim is:

1. A method of producing polyethylene having a molecular weight of about 10,000 to 150,000 which comprises polymerizing ethylene in the presence of a catalyst prepared by mixing an organotin monohydride having the formula $R_3SnH$, wherein R is selected from the group consisting of alkyl, aryl and cycloalkyl radicals, and titanium tetrachloride in the presence of ethylene, the molar ratio of said organotin monohydride to titanium tetrachloride being less than 2.

2. A method of producing polyethylene having a molecular weight of about 10,000 to 150,000 which comprises polymerizing ethylene in the presence of a catalyst prepared by mixing a trialkyl tin monohydride and titanium tetrachloride in the presence of ethylene, the molar ratio of said trialkyl tin monohydride to titanium tetrachloride being less than 2.

3. A method as claimed in claim 2, wherein the trialkyl tin monohydride is tributyl tin hydride.

4. A method as claimed in claim 2, wherein the trialkyl tin monohydride is triethyl tin hydride.

References Cited

UNITED STATES PATENTS

| | | | |
|---|---|---|---|
| 3,067,183 | 12/1962 | Hagemeyer | 260—94.9 |
| 3,088,940 | 5/1963 | Jenkins | 260—94.9 |

FOREIGN PATENTS

| | | |
|---|---|---|
| 538,782 | 12/1955 | Belgium. |

JOSEPH L. SCHOFER, *Primary Examiner.*

L. EDELMAN, *Assistant Examiner.*